(12) United States Patent
Mou et al.

(10) Patent No.: US 12,416,070 B2
(45) Date of Patent: Sep. 16, 2025

(54) HIGH-CU AND HIGH-AL NEODYMIUM IRON BORON MAGNET AND PREPARATION METHOD THEREFOR

(71) Applicant: FUJIAN GOLDEN DRAGON RARE-EARTH Co., Ltd., Fujian (CN)

(72) Inventors: Weiguo Mou, Fujian (CN); Zhixing Xie, Fujian (CN); Jiaying Huang, Fujian (CN); Qingfang Huang, Fujian (CN)

(73) Assignee: FUJIAN GOLDEN DRAGON RARE-EARTH Co., Ltd., Fujian (CN)

( * ) Notice: Subject to any disclaimer, the term of this patent is extended or adjusted under 35 U.S.C. 154(b) by 390 days.

(21) Appl. No.: 17/635,407

(22) PCT Filed: Jul. 7, 2020

(86) PCT No.: PCT/CN2020/100582
§ 371 (c)(1),
(2) Date: Feb. 15, 2022

(87) PCT Pub. No.: WO2021/128802
PCT Pub. Date: Jul. 1, 2021

(65) Prior Publication Data
US 2022/0325391 A1    Oct. 13, 2022

(30) Foreign Application Priority Data
Dec. 24, 2019  (CN) .......................... 201911348739.0

(51) Int. Cl.
*C22C 38/16*   (2006.01)
*C22C 38/00*   (2006.01)
(Continued)

(52) U.S. Cl.
CPC ............ *C22C 38/16* (2013.01); *C22C 38/002* (2013.01); *C22C 38/005* (2013.01); *C22C 38/06* (2013.01);
(Continued)

(58) Field of Classification Search
CPC ..... C22C 38/16; C22C 38/002; C22C 38/005; C22C 38/06; C22C 38/10; C22C 38/12; C22C 38/14; C22C 2202/02; H01F 1/057
(Continued)

(56) References Cited

U.S. PATENT DOCUMENTS

| | | | |
|---|---|---|---|
| 2007/0157998 A1* | 7/2007 | Hirota | ..................... H01F 1/057 148/302 |
| 2017/0018342 A1 | 1/2017 | Fukagawa et al. | |
| 2021/0296028 A1* | 9/2021 | Mao | ..................... H01F 41/0293 |

FOREIGN PATENT DOCUMENTS

| | | |
|---|---|---|
| CN | 101552062 A | 10/2009 |
| CN | 105513737 A | 4/2016 |

(Continued)

OTHER PUBLICATIONS

Cheng Wenhao et.al. [CN108922763A] (Machine translation). (Year: 2018).*

(Continued)

*Primary Examiner* — Sally A Merkling
*Assistant Examiner* — Nazmun Nahar Shams
(74) *Attorney, Agent, or Firm* — Houston Beshining Law Office PLLC; Liangang Ye

(57) ABSTRACT

A high-Cu and high-Al neodymium iron boron magnet and a preparation method therefor. The high-Cu and high-Al neodymium iron boron magnet comprises: 29.5-33.5% R, over 0.985% B, over 0.50% Al, over 0.35% Cu, over 1% RH, and 0.1-0.4% high-melting-point elements N and Fe, wherein the percentages are the mass percentages of the
(Continued)

elements in the total amount of elements, and the mass percentages of the element contents must satisfy the following relationships: (1) 1<RH<0.11R<3.54B; and (2) 0.12RH<Al. By means of combining Al, RH and high-melting-point metal elements that are added at a certain ratio, the problem in which the strength of a high-Cu magnet is insufficient is effectively solved, while the magnetic performance is the magnet material is ensured.

17 Claims, 1 Drawing Sheet

(51) Int. Cl.
      *C22C 38/06*      (2006.01)
      *C22C 38/10*      (2006.01)
      *C22C 38/12*      (2006.01)
      *C22C 38/14*      (2006.01)
      *H01F 1/057*      (2006.01)
      *H02K 1/02*      (2006.01)

(52) U.S. Cl.
    CPC .............. *C22C 38/10* (2013.01); *C22C 38/12* (2013.01); *C22C 38/14* (2013.01); *H01F 1/057* (2013.01); *H02K 1/02* (2013.01); *C22C 2202/02* (2013.01)

(58) Field of Classification Search
    USPC .......................................................... 420/83
    See application file for complete search history.

(56) References Cited

FOREIGN PATENT DOCUMENTS

| | | |
|---|---|---|
| CN | 105575651 A | 5/2016 |
| CN | 106098279 A | 11/2016 |
| CN | 110310795 A | 10/2019 |
| CN | 110993234 A | 4/2020 |
| WO | 2015129861 A1 | 9/2015 |

OTHER PUBLICATIONS

2. Zhang Dapeng, [CN106098279A] (machine translation) (Year: 2016).*
Zhang Faliang et.al. [CN103903824B] (Machine translation) (Year: 2012).*
International Search Report dated Sep. 17, 2020 Issued in PCT application PCT/CN2020/100582.
Written Opinion of International Searching Authority dated Sep. 29, 2020 Issued in PCT application PCT/CN2020/100582.
The priority document CN2019113487390 (Not published).

* cited by examiner

HIGH-CU AND HIGH-AL NEODYMIUM IRON BORON MAGNET AND PREPARATION METHOD THEREFOR The present application is a National Stage of International Application No. PCT/CN2020/100582, filed on Jul. 7, 2020, which claims priority of the Chinese Patent Application No. CN 201911348739.0 filed on Dec. 24, 2019, the contents of which are incorporated herein by reference in their entireties.

TECHNICAL FIELD

The present disclosure relates to high-Cu and high-Al neodymium iron boron magnet and preparation method therefor.

BACKGROUND

Neodymium iron boron permanent magnet material is the most widely used rare earth permanent magnet material at present with its excellent performance, which is widely used in electronics, electric machinery, medical equipment, toys, packaging, hardware machinery, aerospace and other fields, more common in permanent magnet motors, speakers, magnetic separators, computer disk drives, magnetic resonance imaging equipment and meters, etc.

Adding Cu element to the neodymium iron boron magnet can effectively improve the coercivity of the neodymium iron boron magnet. However, when the additive content of Cu exceeds 0.35 wt. %, due to the enrichment of Cu at the grain boundary, micro-cracks will be formed after the magnet is sintered, thereby reducing the compactness and strength of the magnet, which affects the magnetic properties of the neodymium iron boron magnet and limits the availability of the high-Cu technology in the neodymium iron boron magnet.

Content of the Present Invention

The technical problem to be solved in the present disclosure is for overcoming the defect in the prior art that the mechanical properties of the sintered neodymium iron boron magnet will be poorer after increasing the Cu content, and thus high-Cu and high-Al neodymium iron boron magnet and preparation method therefor are provided. The present disclosure can effectively solve the problems of low mechanical strength and low intrinsic coercivity (Hcj) of high-Cu neodymium iron boron magnets by adding a certain proportion of Al, RH, and high-melting-point metal elements in combination.

The present disclosure solves the above-mentioned technical problems through the following technical solutions.

The present disclosure discloses a high-Cu and high-Al neodymium iron boron magnet, which comprises: 29.5-33.5% of R, 0.985% or more of B, 0.50% or more of Al, 0.35% or more of Cu, 1% or more of RH and 0.1-0.4% of high-melting-point element N and Fe; wherein, the percentage is the mass percentage of the element in the total amount of the elements;

wherein, the mass percentage of the element content must satisfy the following relationships: (1) $1<RH<0.11R<3.54B$; (2) $0.12RH<Al$;

wherein, Cu is copper; Al is aluminum; R is praseodymium Pr and/or neodymium Nd; B is boron; RH is dysprosium Dy and/or terbium Tb; high-melting-point metal element N is one or more selected from the group consisting of niobium Nb, zirconium Zr, titanium Ti and hafnium Hf; Fe is iron.

The present disclosure also discloses a high-Cu and high-Al neodymium iron boron magnet, which is made from the following raw materials, the raw materials comprises: 29.5-33.5% of R, 0.985% or more of B, 0.50% or more of Al, 0.35% or more of Cu, 1% or more of RH and 0.1-0.4% of high-melting-point element N and Fe; wherein, the percentage is the mass percentage of the element in the total amount of the elements;

wherein, the mass percentage of the element content must satisfy the following relationships: (1) $1<RH<0.11R<3.54B$; (2) $0.12RH<Al$;

wherein, Cu is copper; Al is aluminum; R is praseodymium Pr and/or neodymium Nd; B is boron; RH is dysprosium Dy and/or terbium Tb; high-melting-point metal element N is one or more selected from the group consisting of niobium Nb, zirconium Zr, titanium Ti and hafnium Hf; Fe is iron.

Preferably, the content of R is 29.5%-30.8%, for example, the content of R is 29.5%, 29.8%, 30%, 30.2%, 30.4% or 30.8%; wherein, the percentage is the mass percentage of the element in the total amount of the elements.

Preferably, the content of B is 0.985%-1.100%; wherein, the percentage is the mass percentage of the element in the total amount of the elements.

More preferably, the content of B is 0.985%-1%, for example, the content of B is 0.985%, 0.99% or 1%; wherein, the percentage is the mass percentage of the element in the total amount of the elements.

Preferably, the content of Al is 0.50%-1.25%, for example, the content of Al is 0.5%, 0.6%, 0.8% or 1.25%; wherein, the percentage is the mass percentage of the element in the total amount of the elements.

Preferably, the content of Cu is 0.35%-0.7%; wherein, the percentage is the mass percentage of the element in the total amount of the elements.

More preferably, the content of Cu is 0.39%-0.6%, for example, the content of Cu is 0.39%, 0.4%, 0.41%, 0.42%, 0.48% or 0.6%; wherein, the percentage is the mass percentage of the element in the total amount of the elements.

More preferably, the content of Cu is $0.35\% \leq Cu<0.5\%$, or $0.5\%<Cu<0.7\%$; wherein, the percentage is the mass percentage of the element in the total amount of the elements.

Preferably, the content of the RH is 1.0%-2.5%; wherein, the percentage is the mass percentage of the element in the total amount of the elements.

More preferably, the content of the RH is 1.1%-2.3%, for example, the content of RH is 1.1%, 1.5%, 1.7%, 1.9%, 2.1%, 2.2% or 2.3%; wherein, the percentage is the mass percentage of the element in the total amount of the elements.

Preferably, the content of the high-melting-point element N is 0.15%-0.35%; wherein, the percentage is the mass percentage of the element in the total amount of the elements.

More preferably, the content of the high-melting-point element N is 0.2%-0.3%, for example, the content of the high-melting-point element N is 0.2%, 0.25% or 0.3%; wherein, the percentage is the mass percentage of the element in the total amount of the elements.

Preferably, the neodymium iron boron magnet or the raw material of the neodymium iron boron magnet further comprises Co in a mass percentage of 0.9-2 wt. %, for example, the content of Co is 1%; wherein, the percentage is the mass percentage of the element in the total amount of the elements.

In the present disclosure, the content of Fe is conventional in the field.

Preferably, the content of Fe is the balance of 100% by mass percentage.

More preferably, the content of Fe is 64%-66%; wherein, the percentage is the mass percentage of the element in the total amount of the elements.

In a preferred embodiment of the present disclosure, the high-Cu and high-Al neodymium iron boron magnet comprises: the content of Nd is 30.2%, Dy is 1.7%, Al is 0.6%, Cu is 0.4%, Co is 1%, Nb is 0.2%, B is 0.99%, and Fe is the balance; wherein, the percentage is the mass percentage of the element in the total amount of the elements.

In a preferred embodiment of the present disclosure, the high-Cu and high-Al neodymium iron boron magnet comprises: the content of Nd is 30.8%, Dy is 1.1%, Al is 0.8%, Cu is 0.6%, Co is 1%, Nb is 0.2%, B is 0.99%, and Fe is the balance; wherein, the percentage is the mass percentage of the element in the total amount of the elements.

In a preferred embodiment of the present disclosure, the high-Cu and high-Al neodymium iron boron magnet comprises: the content of Nd is 30.2%, Dy is 1.7%, Al is 0.6%, Cu is 0.48%, Co is 1%, Zr is 0.3%, B is 1%, and Fe is the balance; wherein, the percentage is the mass percentage of the element in the total amount of the elements.

In a preferred embodiment of the present disclosure, the high-Cu and high-Al neodymium iron boron magnet comprises: the content of Nd is 30.2%, Tb is 1.1%, Al is 0.6%, Cu is 0.4%, Co is 1%, Zr is 0.3%, B is 0.985%, and Fe is the balance; wherein, the percentage is the mass percentage of the element in the total amount of the elements.

In a preferred embodiment of the present disclosure, the high-Cu and high-Al neodymium iron boron magnet, which comprises: the content of Nd is 30.4%, Dy is 1.5%, Al is 1.25%, Cu is 0.39%, Co is 1%, Zr is 0.2%, B is 0.99%, and Fe is the balance; wherein, the percentage is the mass percentage of the element in the total amount of the elements.

In a preferred embodiment of the present disclosure, the high-Cu and high-Al neodymium iron boron magnet, which comprises: the content of Nd is 30%, Dy is 2.2%, Al is 0.8%, Cu is 0.42%, Co is 1%, Zr is 0.2%, B is 0.99%, and Fe is the balance; wherein, the percentage is the mass percentage of the element in the total amount of the elements.

In a preferred embodiment of the present disclosure, the high-Cu and high-Al neodymium iron boron magnet, which comprises: the content of Nd is 30%, Dy is 2.3%, Al is 0.6%, Cu is 0.4%, Co is 1%, Nb is 0.2%, B is 0.99%, and Fe is the balance; wherein, the percentage is the mass percentage of the element in the total amount of the elements.

In a preferred embodiment of the present disclosure, the high-Cu and high-Al neodymium iron boron magnet, which comprises: the content of Nd is 29.8%, Dy is 2.3%, Al is 0.6%, Cu is 0.4%, Co is 1%, Nb is 0.2%, B is 0.99%, and Fe is the balance; wherein, the percentage is the mass percentage of the element in the total amount of the elements.

In a preferred embodiment of the present disclosure, the high-Cu and high-Al neodymium iron boron magnet, which comprises: the content of Nd is 30.2%, Dy is 2.1%, Al is 0.6%, Cu is 0.4%, Co is 1%, Nb is 0.2%, B is 0.99%, and Fe is the balance; wherein, the percentage is the mass percentage of the element in the total amount of the elements.

In a preferred embodiment of the present disclosure, the high-Cu and high-Al neodymium iron boron magnet, which comprises: the content of Nd is 30.2%, Dy is 1.9%, Al is 0.6%, Cu is 0.41%, Co is 1%, Nb is 0.2%, B is 0.99%, and Fe is the balance; wherein, the percentage is the mass percentage of the element in the total amount of the elements.

In a preferred embodiment of the present disclosure, the high-Cu and high-Al neodymium iron boron magnet, which comprises: the content of Nd is 30.2%, Dy is 2.3%, Al is 0.5%, Cu is 0.4%, Co is 1%, Nb is 0.25%, B is 0.99%, and Fe is the balance; wherein, the percentage is the mass percentage of the element in the total amount of the elements.

In a preferred embodiment of the present disclosure, the high-Cu and high-Al neodymium iron boron magnet, which comprises: the content of Nd is 29.5%, Dy is 1.5%, Al is 0.6%, Cu is 0.41%, Co is 1%, Nb is 0.2%, B is 0.99%, and Fe is the balance; wherein, the percentage is the mass percentage of the element in the total amount of the elements.

The present disclosure also discloses a preparation method for the high-Cu and high-Al neodymium iron boron magnet, which comprises the following steps: the raw materials of the high-Cu and high-Al neodymium iron boron magnet is successively subjected to melting, hydrogen decrepitation, jet milling, forming, sintering and aging.

In the present disclosure, as is known to those skilled in the art, the raw material of the high-Cu and high-Al neodymium iron boron magnet is the raw material which satisfies the mass percentages of the element content and the relationships among the mass percentages of the element content of the high-Cu and high-Al neodymium iron boron magnet as described above.

In the present disclosure, the melting can be conventional in the field, preferably, the melting is to obtain neodymium iron boron alloy casting strips by using strip casting method.

Wherein, the average thickness of the neodymium iron boron alloy casting strips is preferably 0.25-0.35 mm, more preferably 0.28-0.3 mm, for example, 0.28 mm, 0.29 mm or 0.30 mm.

In the present disclosure, the hydrogen decrepitation can be conventional in the field. Preferably, the hydrogen decrepitation comprises a hydrogen adsorption process and a dehydrogenation process, and the neodymium iron boron alloy casting strips can be subjected to hydrogen decrepitation to obtain neodymium iron boron powder.

Wherein, the hydrogen pressure of the hydrogen adsorption process is preferably 0.067-0.098 MPa, more preferably 0.08-0.085 MPa, for example, 0.081 MPa.

Wherein, the temperature of the dehydrogenation process is preferably 480-530° C., more preferably 500-510° C., for example, 500° C.

In the present disclosure, the jet milling can be conventional in the field, preferably, the jet milling is to send the neodymium iron boron powder into a jet mill for jet milling to continue pulverizing to obtain fine powder.

Wherein, the particle size of the fine powder is preferably 3.8-4.1 μm, more preferably 3.9-4.0 μm, for example, 3.95 μm.

Wherein, the oxygen content in the milling chamber of the jet mill in the jet milling is preferably 50 ppm or less.

Wherein, the rotation speed of the sorting wheel in the jet milling is preferably 3500-4300 rpm/min, more preferably 3900-4100 rpm/min, for example, 4000 rpm/min.

In the present disclosure, the forming can be conventional in the field, preferably, the fine powder is formed by orientation under a certain magnetic field intensity to obtain a compact.

Wherein, the forming is preferably carried out under the magnetic field intensity of 1.8T or more and the protection of nitrogen atmosphere.

Wherein, the forming is preferably carried out under the magnetic field intensity of 1.8-2.5T, for example, 1.9T.

In the present disclosure, the sintering can be conventional in the field.

Wherein, the temperature of the sintering is preferably 1030-1080° C., more preferably 1040-1050° C., for example, 1040° C. or 1050° C.

Wherein, the time of the sintering is preferably 4-7 hours, more preferably 6 h.

In the present disclosure, the aging can be conventional in the field.

Wherein, the temperature of the aging treatment is preferably 460-520° C., more preferably 500° C.

Wherein, the time of the aging treatment is preferably 4-10 h, more preferably 6 h.

The present disclosure also discloses a high-Cu and high-Al neodymium iron boron magnet, which comprises: main phase and grain boundary phase;
  wherein, the composition of the main phase is: $R_{23-29}RH_{0.1-3.1}Fe_{66-73.5}Al_{10.45-1.53}B_{0.9-1.1}$; the composition of the grain boundary phase is: $R_{35-48}RH_{0.5-5.9}Fe_{46-56.5}Al_{0.05-0.25}N_{1.5-6.2}B_{0.8-1.1}Cu_{6-15}$;
  wherein, Cu is copper; Al is aluminum; R is praseodymium Pr and/or neodymium Nd; B is boron; RH is dysprosium Dy and/or terbium Tb; high-melting-point metal element N is one or more selected from the group consisting of niobium Nb, zirconium Zr, titanium Ti and hafnium Hf; Fe is iron;
  wherein, the mass ratio of the main phase to the magnet is 86-94 wt. %, and the mass ratio of the grain boundary phase to the magnet is 5-14 wt. %;
  preferably, the composition of the main phase is: $R_{23-29}RH_{0.1-3.1}Fe_{65-71}Al_{0.45-1.53}Co_{1-2.5}B_{0.9-1.1}$; the composition of the grain boundary phase is: $R_{35-48}RH_{0.5-5.9}Fe_{45-51}Al_{0.05-0.25}N_{1.5-6.2}B_{0.8-1.1}Cu_{6-15}Co_{1-5.5}$;
  wherein, Co is cobalt.

The present disclosure also discloses a use of the high-Cu and high-Al neodymium iron boron magnet as mentioned above in a motor as motor rotor magnet material.

Based on the common sense in the field, the preferred conditions of the preparation methods can be combined arbitrarily to obtain preferred examples of the present disclosure.

The reagents and raw materials used in the present disclosure are commercially available.

The positive progressive effects of the present disclosure are as follows:

The present disclosure can effectively solve the problem of insufficient strength of high-Cu magnet and meanwhile ensure the magnetic properties of the magnet material by adding a certain proportion of Al, RH, and high-melting-point metal elements in combination.

The neodymium iron boron magnet of the present disclosure can meet the following conditions: Br is greater than 12.5 kGs, Hcj is greater than 23 kOe, Hk/Hcj is greater than 0.97, and bending strength is greater than 430 MPa.

DETAILED DESCRIPTION OF THE PREFERRED EMBODIMENT

Figure 1:
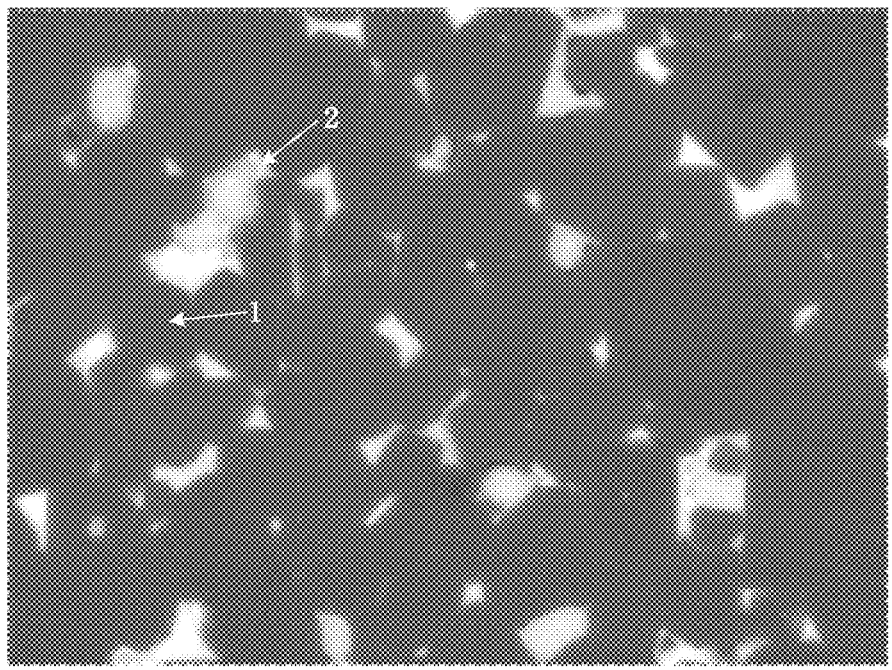
FIG. 1 is the SEM spectrum of the neodymium iron boron magnet of Example 1.

The following examples further illustrate the present disclosure, but the present disclosure is not limited thereto. Experiment methods in which specific conditions are not indicated in the following examples are selected according to conventional methods and conditions, or according to the product specification.

The mass percentages of the elements in the neodymium iron boron magnet in each Examples 1-12 and Comparative Examples 13-24 are shown in Table 1 below.

In the table below, wt. % refers to the mass percentage of the element in the total amount of the elements, and "I" means that the element is not added. "Br" is remanence, "Hcj" is the intrinsic coercivity, and "Hk/Hcj" is the squareness ratio.

Table 1 the mass percentages of the elements in neodymium iron boron magnets

| | | | | | Content (wt. %) | | | | | | |
|---|---|---|---|---|---|---|---|---|---|---|---|
| No. | Pr | Nd | Tb | Dy | Al | Cu | Co | Nb | Zr | B | Fe |
| 1 | / | 30.2 | / | 1.7 | 0.6 | 0.4 | 1 | 0.2 | / | 0.99 | bal |
| 2 | / | 30.8 | / | 1.1 | 0.8 | 0.6 | 1 | 0.2 | / | 0.99 | bal |
| 3 | / | 30.2 | / | 1.7 | 0.6 | 0.48 | 1 | / | 0.3 | 1 | bal |
| 4 | / | 30.2 | 1.1 | / | 0.6 | 0.4 | 1 | / | 0.3 | 0.985 | bal |
| 5 | / | 30.4 | / | 1.5 | 1.25 | 0.39 | 1 | / | 0.2 | 0.99 | bal |
| 6 | / | 30 | / | 2.2 | 0.8 | 0.42 | 1 | / | 0.2 | 0.99 | bal |
| 7 | / | 30 | / | 2.3 | 0.6 | 0.4 | 1 | 0.2 | / | 0.99 | bal |
| 8 | / | 29.8 | / | 2.3 | 0.6 | 0.4 | 1 | 0.2 | / | 0.99 | bal |
| 9 | / | 30.2 | / | 2.1 | 0.6 | 0.4 | 1 | 0.2 | / | 0.99 | bal |
| 10 | / | 30.2 | / | 1.9 | 0.6 | 0.41 | 1 | 0.2 | / | 0.99 | bal |
| 11 | / | 30.2 | / | 2.3 | 0.5 | 0.4 | 1 | 0.25 | / | 0.99 | bal |
| 12 | / | 29.5 | / | 1.5 | 0.6 | 0.41 | 1 | 0.2 | / | 0.99 | bal |
| 13 | / | 30.2 | / | 1.7 | 0.4 | 0.4 | 1 | 0.25 | / | 0.99 | bal |
| 14 | / | 30.2 | / | / | / | 0.4 | 1 | / | / | 0.99 | bal |
| 15 | / | 30.2 | / | / | 0.6 | 0.4 | 1 | / | / | 0.99 | bal |
| 16 | / | 30.2 | / | 1.7 | / | 0.4 | 1 | / | / | 0.99 | bal |
| 17 | / | 30.2 | / | / | / | 0.4 | 1 | 0.2 | / | 0.99 | bal |
| 18 | 7.55 | 22.65 | / | 1.7 | 0.18 | 0.4 | 1 | 0.2 | / | 0.99 | bal |
| 19 | / | 30.2 | / | 0.5 | 0.6 | 0.4 | 1 | 0.2 | / | 0.99 | bal |
| 20 | / | 26 | / | 3 | 0.6 | 0.4 | 1 | 0.2 | / | 0.99 | bal |
| 21 | / | 32 | / | 1.1 | 0.6 | 0.4 | 1 | 0.2 | / | 0.99 | bal |
| 22 | / | 30.2 | / | 1.7 | 0.6 | 0.48 | 1 | / | 0.3 | 1 | bal |

-continued

| | | | | | Content (wt. %) | | | | | |
|---|---|---|---|---|---|---|---|---|---|---|
| No. | Pr | Nd | Tb | Dy | Al | Cu | Co | Nb | Zr | B | Fe |
| 23 | 7.55 | 22.65 | / | 1.7 | 0.6 | 0.48 | 1 | / | 0.3 | 1 | bal |
| 24 | / | 30.2 | / | 1.7 | 0.6 | 0.48 | 1 | / | 0.3 | 1 | bal |

Note:
bal refers to the balance.

EXAMPLE 1

The preparation method for neodymium iron boron magnet was as follows:
 (1) Melting: according to the mass percentages of the elements in each example and comparative example as shown in Table 1, the raw material formulas meeting the mass percentages of the elements were configured. The raw material was melted and the strip casting method was adopted to obtain neodymium iron boron alloy casting strips.
The average thickness of the neodymium iron boron alloy casting strips was 0.28 mm
 (2) Hydrogen decrepitation: the hydrogen pressure of the hydrogen adsorption process of the neodymium iron boron alloy casting strips was 0.081 MPa; the temperature of the dehydrogenation process was 500° C., neodymium iron boron powder was obtained.
 (3) Jet milling: the neodymium iron boron powder was sent into a jet mill for jet milling to continue pulverizing, fine powder was obtained.
The oxygen content in the milling chamber of the jet mill was 50 ppm or less.
The rotation speed of the sorting wheel in the jet milling was 4000 rpm/min
The particle size of fine powder was 3.95 μm.
 (4) Forming: the fine powder was formed by orientation under a certain magnetic field intensity to obtain the compact.
The forming was carried out under the magnetic field intensity of 1.9T and the protection of nitrogen atmosphere.
 (5) Sintering
The temperature of the sintering was 1050° C. The time of the sintering was 6h.
 (6) Aging
The temperature of the aging treatment was 500° C. The time of the aging treatment was 6 h.
In the preparation process of Examples 5-12 and Comparative Examples 13-17, except that the selected raw material formulas were different, the parameters in the preparation process were the same as those in Example 1.

EXAMPLE 2

The preparation method for neodymium iron boron magnet was as follows:
Except that the selected raw material formulas were different and the average thickness of the neodymium iron boron alloy casting strips in the step (1) melting was 0.30 mm, the other parameters in the preparation process were the same as those in Example 1.
For the preparation process of Comparative Examples 18-21, except that the selected raw material formulas were different, the parameters in the preparation process were the same as those in Example 2.

EXAMPLE 3

The preparation method for neodymium iron boron magnet was as follows:
Except that the selected raw material formulas were different and the temperature of the sintering in step (5) sintering was 1040° C., the other parameters in the preparation process were the same as those in Example 1.

EXAMPLE 4

The preparation method for neodymium iron boron magnet was as follows:
Except that the selected raw material formulas were different and the average thickness of the neodymium iron boron alloy casting strips in the step (1) melting was 0.29 mm, the other parameters in the preparation process were the same as those in Example 1.

COMPARATIVE EXAMPLE 22

The preparation method for neodymium iron boron magnet was as follows:
Except that the selected raw material formulas were different and the average thickness of the neodymium iron boron alloy casting strips in the step (1) melting was 0.38 mm, the other parameters in the preparation process were the same as those in Example 3.

COMPARATIVE EXAMPLE 23

The preparation method for neodymium iron boron magnet was as follows:
Except that the selected raw material formulas were different and the temperature of the sintering in step (5) sintering was 1080° C., the other parameters in the preparation process were the same as those in Example 3.

COMPARATIVE EXAMPLE 24

The preparation method for neodymium iron boron magnet was as follows:
Except that the selected raw material formulas were different and the particle size of fine powder in the step (3) jet milling was 4.25 μm, the other parameters in the preparation process were the same as those in Example 3.

EFFECT EXAMPLE 1

The magnetic properties and bending strength of the neodymium iron boron magnets prepared in each example and comparative example were measured, as shown in Table 2 below.
The Br, Hcj and Hk/Hcj in each example and comparative example of the present disclosure were tested using the NIM-62000 rare earth permanent magnet measurement system of the National Institute of Metrology, China; the bending strength was tested under the standard of GB/T 14452-93 (three-point bending) using three-point bending equipment.

Table 2 the magnetic properties and bending strength of the neodymium iron boron magnets

| No. | Br (kGs) | Hcj (kOe) | Hk/Hcj | Bending strength (MPa) |
|---|---|---|---|---|
| 1 | 13.12 | 23.36 | 0.99 | 451 |
| 2 | 13.11 | 23.25 | 0.98 | 447 |
| 3 | 13.09 | 23.51 | 0.99 | 439 |
| 4 | 13.37 | 23.74 | 0.99 | 445 |
| 5 | 12.58 | 26.03 | 0.98 | 436 |
| 6 | 12.74 | 25.71 | 0.99 | 465 |
| 7 | 12.87 | 25.07 | 0.99 | 439 |
| 8 | 12.91 | 24.98 | 0.99 | 446 |
| 9 | 12.92 | 24.56 | 0.98 | 438 |
| 10 | 13.02 | 23.96 | 0.98 | 451 |
| 11 | 12.91 | 24.66 | 0.99 | 453 |
| 12 | 13.12 | 24.25 | 0.97 | 436 |
| 13 | 13.32 | 21.31 | 0.99 | 396 |
| 14 | 14.10 | 14.86 | 0.87 | 352 |
| 15 | 13.63 | 17.73 | 0.89 | 332 |
| 16 | 13.75 | 19.25 | 0.85 | 315 |
| 17 | 13.98 | 15.35 | 0.84 | 337 |
| 18 | 13.52 | 20.22 | 0.93 | 396 |
| 19 | 13.41 | 19.36 | 0.98 | 387 |
| 20 | 13.45 | 22.98 | 0.87 | 393 |
| 21 | 13.10 | 20.38 | 0.83 | 364 |
| 22 | 13.08 | 21.68 | 0.94 | 403 |
| 23 | 13.09 | 21.83 | 0.85 | 412 |
| 24 | 13.10 | 21.23 | 0.83 | 354 |

It can be seen that the examples of the present disclosure can effectively solve the problems of insufficient strength of high-Cu magnet and meanwhile ensure the magnetic properties of magnet material.

EFFECT EXAMPLE 2

By adding a certain amount of Cu, Al, Dy, Nb in combination, it can be found that Cu and high-melting-point elements such as Nb are enriched in most of the grain boundary phase area in the magnet, while the heavy rare earth elements Dy and Al are barren at grain boundaries; more specifically, Cu and high-melting-point elements such as Nb are enriched in the grain boundary phase area, and the existence of enrichment area of Cu and the high-melting-point elements in the grain boundary phase contributes to preventing the abnormal growth of crystal grains during the sintering process, reducing the sensitivity of the magnet to the temperature of the sintering, which is beneficial to increase the temperature of the sintering, the increase of the sintering temperature is beneficial to improve the coercive force and mechanical strength of the magnet. At the same time, the content of Al and Dy in the grain boundary phase is relatively low, the poorness of Al and Dy in the grain boundary phase means that more Al and Dy exist in the phase interface between the main phase and grain boundary phase of the neodymium iron boron magnet, the existence of Al in the phase interface is beneficial to improve the fluidity of the intergranular phase during the high-temperature heat treatment process, thereby forming a more stable phase interface and reducing the interface energy, thereby improving the mechanical strength of the magnet. The existence of Dy in the phase interface is beneficial to increase the magnetocrystalline anisotropy field of the phase interface, thereby increasing the coercivity of the magnet.

Taking Example 1 as an example, it can be seen from the SEM spectrum (FIG. 1) that the magnet of Example 1 is composed of main phase of $Nd_2Fe_{14}B$ (reference number 1, gray area) and intergranular Nd-riched phase (reference number 2, silver-white area). The EPMA microanalysis of Example 1 is shown in FIG. 2.

Figure 2:
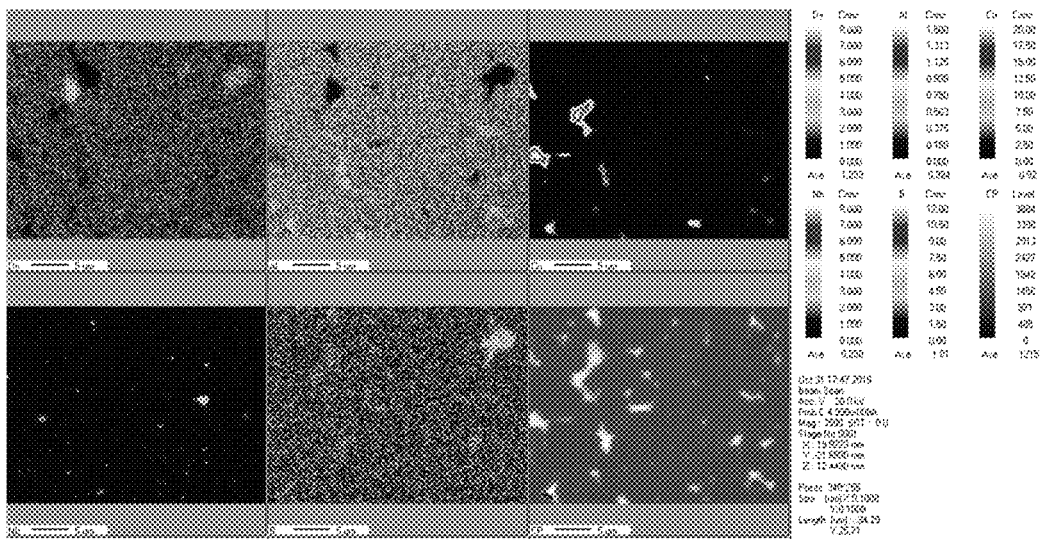
FIG. 2 is the EPMA spectrum of the neodymium iron boron magnet of Example 1.

The results of EPMA microanalysis can be obtained from FIG. 2:

The composition of the main phase of the magnet is: $Nd_{25-28}Dy_{0.1-2.1}Fe_{65-71}Al_{0.55-1.2}Co_{1-2.5}B_{0.9-1.1}$, the composition of the grain boundary phase is: $Nd_{35-48}Dy_{0.5-4.5}Fe_{45-51}Al_{0.05-0.25}Nb_{1.5-6}B_{0.8-1.1}Cu_{6-15}Co_{1-5.5}$; wherein, the proportion of the main phase is 88-93 wt. %, and the proportion of the grain boundary phase is 7-12 wt. %.

The above is the main reason why the mechanical strength and coercivity of the magnet with high Cu content in the present disclosure do not deteriorate due to the high Cu content.

| No. | Main phase | Main phase content (%) | Grain boundary phase | Grain boundary phase content (%) |
|---|---|---|---|---|
| 1 | $Nd_{25-28}Dy_{0.1-2.1}Fe_{65-71}Al_{0.55-1.2}Co_{1-2.5}B_{0.9-1.1}$ | 88-93 wt % | $Nd_{35-48}Dy_{0.5-4.5}Fe_{45-51}Al_{0.05-0.25}Nb_{1.5-6}B_{0.8-1.1}Cu_{6-15}Co_{1-5.5}$ | 7-12 wt % |
| 2 | $Nd_{25-28}Dy_{0.1-1.8}Fe_{65-71}Al_{0.77-1.2}Co_{1-2.5}B_{0.9-1.1}$ | 88-94 wt % | $Nd_{35-48}Dy_{0.5-4.1}Fe_{45-51}Al_{0.05-0.24}Nb_{1.5-6}B_{0.8-1.1}Cu_{6-14}Co_{1-5.5}$ | 6-12 wt % |
| 3 | $Nd_{24-28}Dy_{0.1-2.2}Fe_{65-71}Al_{0.77-1.2}Co_{1-2.5}B_{0.9-1.1}$ | 88-93 wt % | $Nd_{35-48}Dy_{0.5-3.9}Fe_{45-51}Al_{0.05-0.25}Zr_{1.5-6.2}B_{0.8-1.1}Cu_{6-14}Co_{1-5.5}$ | 7-12 wt % |
| 4 | $Nd_{24-28}Tb_{1-1.8}Fe_{65-71}Al_{0.77-1.2}Co_{1-2.5}B_{0.9-1.1}$ | 89-95 wt % | $Nd_{35-48}Dy_{0.5-4.1}Fe_{45-51}Al_{0.05-0.25}Zr_{1.5-6.2}B_{0.8-1.1}Cu_{6-14}Co_{1-5.5}$ | 5-11 wt % |
| 5 | $Nd_{23-28}Dy_{0.1-2.1}Fe_{65-71}Al_{0.79-1.53}Co_{1-2.5}B_{0.9-1.1}$ | 87-93 wt % | $Nd_{35-48}Dy_{0.5-4.5}Fe_{45-51}Al_{0.05-0.25}Zr_{1.5-5.6}B_{0.8-1.1}Cu_{6-15}Co_{1-5.5}$ | 7-13 wt % |
| 6 | $Nd_{24-28}Dy_{0.2-3.1}Fe_{65-71}Al_{0.75-1.45}Co_{1-2.5}B_{0.9-1.1}$ | 86-92 wt % | $Nd_{35-48}Dy_{0.7-5.6}Fe_{45-51}Al_{0.05-0.25}Zr_{1.5-5.5}B_{0.8-1.1}Cu_{6-15}Co_{1-5.5}$ | 8-14 wt % |
| 7 | $Nd_{25-28}Dy_{0.2-3.1}Fe_{65-71}Al_{0.75-1.42}Co_{1-2.5}B_{0.9-1.1}$ | 86-92 wt % | $Nd_{35-48}Dy_{0.7-5.8}Fe_{45-51}Al_{0.05-0.21}Nb_{1.5-5.5}B_{0.8-1.1}Cu_{6-15}Co_{1-5.5}$ | 8-14 wt % |
| 8 | $Nd_{25-27}Dy_{0.1-2.6}Fe_{65-71}Al_{0.55-1.2}Co_{1-2.5}B_{0.9-1.1}$ | 89-94 wt % | $Nd_{35-48}Dy_{0.5-4.8}Fe_{45-51}Al_{0.05-0.24}Nb_{1.5-6}B_{0.8-1.1}Cu_{6-15}Co_{1-5.5}$ | 6-11 wt % |
| 9 | $Nd_{25-29}Dy_{0.1-2.0}Fe_{65-71}Al_{0.55-1.2}Co_{1-2.5}B_{0.9-1.1}$ | 88-93 wt % | $Nd_{35-48}Dy_{0.5-4.3}Fe_{45-51}Al_{0.05-0.25}Nb_{1.5-6}B_{0.8-1.1}Cu_{6-15}Co_{1-5.5}$ | 7-12 wt % |
| 10 | $Nd_{25-29}Dy_{0.1-1.8}Fe_{65-71}Al_{0.55-1.2}Co_{1-2.5}B_{0.9-1.1}$ | 88-94 wt % | $Nd_{35-48}Dy_{0.5-4.1}Fe_{45-51}Al_{0.05-0.25}Nb_{1.5-6}B_{0.8-1.1}Cu_{6-15}Co_{1-5.5}$ | 6-12 wt % |
| 11 | $Nd_{25-29}Dy_{0.2-3.1}Fe_{65-70}Al_{0.45-0.83}Co_{1-2.5}B_{0.9-1.1}$ | 86-92 wt % | $Nd_{35-48}Dy_{0.8-5.9}Fe_{45-51}Al_{0.05-0.21}Nb_{1.5-5.8}B_{0.8-1.1}Cu_{6-15}Co_{1-5.5}$ | 8-14 wt % |

-continued

| No. | Main phase | Main phase content (%) | Grain boundary phase | Grain boundary phase content (%) |
|---|---|---|---|---|
| 12 | $Nd_{25-27}Dy_{0.2-3.0}Fe_{65-71}Al_{0.47-0.91}Co_{1-2.5}B_{0.9-1.1}$ | 86-92 wt % | $Nd_{35-48}Dy_{0.7-4.7}Fe_{45-51}Al_{0.05-0.21}Nb_{1.5-5.3}B_{0.8-1.1}Cu_{6-15}Co_{1-5.5}$ | 8-14 wt % |
| 13 | $Nd_{25-28}Dy_{0.1-2.5}Fe_{65-71}Al_{0.32-0.67}Co_{1-2.5}B_{0.9-1.1}$ | 89-94 wt % | $Nd_{35-48}Dy_{0.5-2.5}Fe_{45-51}Al_{0.05-0.15}Nb_{1.5-6}B_{0.8-1.1}Cu_{6-15}Co_{1-5.5}$ | 6-11 wt % |
| 14 | $Nd_{27-31}Fe_{65-71}Co_{1-2.5}B_{0.9-1.1}$ | 90-95 wt % | $Nd_{36-53}Fe_{45-51}B_{0.8-1.1}Cu_{6-14}Co_{1-5.5}$ | 5-10 wt % |
| 15 | $Nd_{26-31}Fe_{65-71}Al_{0.30-0.83}Co_{1-2.5}B_{0.9-1.1}$ | 88-95 wt % | $Nd_{35-48}Fe_{45-51}Al_{0.05-0.24}B_{0.8-1.1}Cu_{6-14}Co_{1-5.5}$ | 5-12 wt % |
| 16 | $Nd_{25-28}Dy_{0.1-2.1}Fe_{65-71}Co_{1-2.5}B_{0.9-1.1}$ | 90-94 wt % | $Nd_{35-48}Dy_{0.5-4.5}Fe_{45-51}B_{0.8-1.1}Co_{1-5.5}$ | 6-10 wt % |
| 17 | $Nd_{26-31}Fe_{65-71}Co_{1-2.5}B_{0.9-1.1}$ | 88-93 wt % | $Nd_{38-53}Fe_{45-51}Nb_{1.5-6}B_{0.8-1.1}Cu_{6-15}Co_{1-5.5}$ | 7-12 wt % |
| 18 | $Nd_{18-20}Pr_{7-9}Dy_{0.1-2.1}Fe_{65-71}Al_{0.15-0.34}Co_{1-2.5}B_{0.9-1.1}$ | 88-93 wt % | $Nd_{20-30}Pr_{15-19}Dy_{0.5-4.5}Fe_{45-51}Al_{0.05-0.10}Nb_{1.5-6}B_{0.8-1.1}Cu_{6-15}Co_{1-5.5}$ | 7-12 wt % |
| 19 | $Nd_{25-28}Dy_{0.1-0.6}Fe_{65-71}Al_{0.55-1.1}Co_{1-2.5}B_{0.9-1.1}$ | 89-94 wt % | $Nd_{35-48}Dy_{0.2-0.6}Fe_{45-51}Al_{0.05-0.35}Nb_{1.5-6}B_{0.8-1.1}Cu_{6-15}Co_{1-5.5}$ | 6-11 wt % |
| 20 | $Nd_{25-28}Dy_{0.1-2.8}Fe_{65-71}Al_{0.55-1.2}Co_{1-2.5}B_{0.9-1.1}$ | 91-96 wt % | $Nd_{35-48}Dy_{0.5-5.7}Fe_{45-51}Al_{0.05-0.25}Nb_{1.5-6}B_{0.8-1.1}Cu_{6-15}Co_{1-5.5}$ | 4-9 wt % |
| 21 | $Nd_{25-28}Dy_{0.1-1.5}Fe_{65-71}Al_{0.55-1.2}Co_{1-2.5}B_{0.9-1.1}$ | 87-92 wt % | $Nd_{35-48}Dy_{0.5-4.1}Fe_{45-51}Al_{0.05-0.25}Nb_{1.5-6}B_{0.71-0.79}Cu_{6-15}Co_{1-5.5}$ | 8-13 wt % |
| 22 | $Nd_{25-29}Dy_{0.1-2.1}Fe_{65-72}Al_{0.55-1.1}Co_{1-2.5}B_{0.9-1.1}$ | 89-94 wt % | $Nd_{35-46}Dy_{0.5-4.5}Fe_{45-52}Al_{0.05-0.25}Nb_{1.5-6}B_{0.8-1.1}Cu_{6-14}Co_{1-5.5}$ | 6-11 wt % |
| 23 | $Nd_{18-20}Pr_{7-9}Dy_{0.1-2.1}Fe_{65-71}Al_{0.15-0.34}Co_{1-2.5}B_{0.9-1.1}$ | 88-94 wt % | $Nd_{20-30}Pr_{15-19}Dy_{0.5-4.5}Fe_{45-51}Al_{0.05-0.10}Nb_{1.5-6}B_{0.8-1.1}Cu_{6-15}Co_{1-5.5}$ | 6-12 wt % |
| 24 | $Nd_{25-27}Dy_{0.1-2.1}Fe_{65-70}Al_{0.55-1.2}Co_{1-2.5}B_{0.9-1.1}$ | 88-93 wt % | $Nd_{35-49}Dy_{0.5-4.5}Fe_{45-52}Al_{0.05-0.25}Nb_{1.5-6}B_{0.8-1.1}Cu_{6-15}Co_{1-5.5}$ | 7-12 wt % |

What is claimed is:

1. A neodymium iron boron magnet, comprising: 29.5-33.5% of R, 0.985%-1% of B, 0.50%-1.25% of Al, 0.35% or more of Cu, 1% or more of RH and 0.1-0.4% of X, 0.9-2% of Co and Fe; wherein, the percentage is the mass percentage of the element in the total amount of the elements;

wherein, the mass percentage of the element content must satisfy the following relationships: (1) 1<RH<0.11R<3.54B; (2) 0.12RH<Al;

wherein, Cu is copper; Al is aluminum; R is any one of the following: (1) neodymium Nd; (2) praseodymium Pr and neodymium Nd; B is boron; RH is selected from the group consisting of dysprosium Dy and terbium Tb; X is at least one selected from the group consisting of niobium Nb and zirconium Zr; Fe is iron;

wherein, the neodymium iron boron magnet comprises main phase and grain boundary phase; the composition of the main phase is: $R_{23-29}RH_{0.1-3.1}Fe_{65-71}Al_{0.45-1.53}Co_{1-2.5}B_{0.9-1.1}$; the composition of the grain boundary phase is: $R_{35-48}RH_{0.5-5.9}Fe_{45-51}Al_{0.05-0.25}X_{1.5-6.2}B_{0.8-1.1}Cu_{6-15}Co_{1-5.5}$.

2. A neodymium iron boron magnet, wherein, which is made from raw materials comprising:

29.5-33.5% of R, 0.985%-1% of B, 0.50%-1.25% of Al, 0.35% or more of Cu, 1% or more of RH and 0.1-0.4% of X, 0.9-2% of Co and Fe; wherein, the percentage is the mass percentage of the element in the total amount of the elements;

wherein, the mass percentage of the element content must satisfy the following relationships: (1) 1<RH<0.11R<3.54B; (2) 0.12RH<Al;

wherein, Cu is copper; Al is aluminum; R is any one of the following: (1) neodymium Nd; (2) praseodymium Pr and neodymium Nd; B is boron; RH is selected from the group consisting of dysprosium Dy and terbium Tb; X is at least one selected from the group consisting of niobium Nb and zirconium Zr; Fe is iron;

wherein, the neodymium iron boron magnet comprises main phase and grain boundary phase; the composition of the main phase is: $R_{23-29}RH_{0.1-3.1}Fe_{65-71}Al_{0.45-1.53}Co_{1-2.5}B_{0.9-1.1}$; the composition of the grain boundary phase is: $R_{35-48}RH_{0.5-5.9}Fe_{45-51}Al_{0.05-0.25}X_{1.5-6.2}B_{0.8-1.1}Cu_{6-15}Co_{1-5.5}$.

3. The neodymium iron boron magnet according to claim 1, wherein, the content of R is 29.5%-30.8%; wherein, the percentage is the mass percentage of the element in the total amount of the elements.

4. The neodymium iron boron magnet according to claim 1, wherein, the neodymium iron boron magnet comprises: the content of Nd is 30.2%, Dy is 1.7%, Al is 0.6%, Cu is 0.4%, Co is 1%, Nb is 0.2%, B is 0.99%, and Fe is the balance; wherein, the percentage is the mass percentage of the element in the total amount of the elements;

or, the neodymium iron boron magnet comprises: the content of Nd is 30.8%, Dy is 1.1%, Al is 0.8%, Cu is 0.6%, Co is 1%, Nb is 0.2%, B is 0.99%, and Fe is the balance; wherein, the percentage is the mass percentage of the element in the total amount of the elements;

or, the neodymium iron boron magnet comprises: the content of Nd is 30.2%, Dy is 1.7%, Al is 0.6%, Cu is 0.48%, Co is 1%, Zr is 0.3%, B is 1%, and Fe is the balance; wherein, the percentage is the mass percentage of the element in the total amount of the elements;

or, the neodymium iron boron magnet comprises: the content of Nd is 30.2%, Tb is 1.1%, Al is 0.6%, Cu is 0.4%, Co is 1%, Zr is 0.3%, B is 0.985%, and Fe is the balance; wherein, the percentage is the mass percentage of the element in the total amount of the elements;

or, the neodymium iron boron magnet comprises: the content of Nd is 30.4%, Dy is 1.5%, Al is 1.25%, Cu is 0.39%, Co is 1%, Zr is 0.2%, B is 0.99%, and Fe is the balance; wherein, the percentage is the mass percentage of the element in the total amount of the elements;

or, the neodymium iron boron magnet comprises: the content of Nd is 30%, Dy is 2.2%, Al is 0.8%, Cu is 0.42%, Co is 1%, Zr is 0.2%, B is 0.99%, and Fe is the balance; wherein, the percentage is the mass percentage of the element in the total amount of the elements;

or, the neodymium iron boron magnet comprises: the content of Nd is 30%, Dy is 2.3%, Al is 0.6%, Cu is 0.4%, Co is 1%, Nb is 0.2%, B is 0.99%, and Fe is the balance; wherein, the percentage is the mass percentage of the element in the total amount of the elements;

or, the neodymium iron boron magnet comprises: the content of Nd is 29.8%, Dy is 2.3%, Al is 0.6%, Cu is 0.4%, Co is 1%, Nb is 0.2%, B is 0.99%, and Fe is the balance; wherein, the percentage is the mass percentage of the element in the total amount of the elements;

or, the neodymium iron boron magnet comprises: the content of Nd is 30.2%, Dy is 2.1%, Al is 0.6%, Cu is 0.4%, Co is 1%, Nb is 0.2%, B is 0.99%, and Fe is the balance; wherein, the percentage is the mass percentage of the element in the total amount of the elements;

or, the neodymium iron boron magnet comprises: the content of Nd is 30.2%, Dy is 1.9%, Al is 0.6%, Cu is 0.41%, Co is 1%, Nb is 0.2%, B is 0.99%, and Fe is the balance; wherein, the percentage is the mass percentage of the element in the total amount of the elements;

or, the neodymium iron boron magnet comprises: the content of Nd is 30.2%, Dy is 2.3%, Al is 0.5%, Cu is 0.4%, Co is 1%, Nb is 0.25%, B is 0.99%, and Fe is the balance; wherein, the percentage is the mass percentage of the element in the total amount of the elements;

or, the neodymium iron boron magnet comprises: the content of Nd is 29.5%, Dy is 1.5%, Al is 0.6%, Cu is 0.41%, Co is 1%, Nb is 0.2%, B is 0.99%, and Fe is the balance; wherein, the percentage is the mass percentage of the element in the total amount of the elements.

5. A preparation method for the neodymium iron boron magnet according to claim 1, comprising the following steps: raw materials of the neodymium iron boron magnet are successively subjected to melting, hydrogen decrepitation, jet milling, forming, sintering and aging.

6. The preparation method according to claim 5, wherein, the melting is to obtain neodymium iron boron alloy casting strips by using strip casting method;
the hydrogen decrepitation comprises a hydrogen adsorption process and a dehydrogenation process, to obtain neodymium iron boron powder;
wherein, the hydrogen pressure of the hydrogen adsorption process is 0.067-0.098 MPa;
wherein, the temperature of the dehydrogenation process is 480-530° C.;
the jet milling is to send the neodymium iron boron powder into a jet mill for jet milling to continue pulverizing to obtain fine powder;
wherein, the oxygen content in the milling chamber of the jet mill in the jet milling is 50 ppm or less;
wherein, the rotation speed of the sorting wheel in the jet milling is 3500-4300 rpm/min;
the forming is carried out under the magnetic field intensity of 1.8T or more and the protection of nitrogen atmosphere;
the time of the sintering is 4-7 hours;
the temperature of aging treatment is 460-520° C.;
the time of aging treatment is 4-10h.

7. The preparation method according to claim 6, wherein, the average thickness of the neodymium iron boron alloy casting strips is 0.25-0.35 mm;
or, the particle size of the fine powder is 3.8-4.1 µm;
or, the temperature of the sintering is 1030-1080° C.

8. A motor rotor magnet material in a motor comprising the neodymium iron boron magnet according to claim 1.

9. The neodymium iron boron magnet according to claim 1, wherein, the content of Cu is 0.35%-0.7%,
or, the content of the X is 0.15%-0.35%,
the percentage is the mass percentage of the element in the total amount of the elements.

10. The neodymium iron boron magnet according to claim 1, wherein, the content of the RH is 1.0%-2.5%, the percentage is the mass percentage of the element in the total amount of the elements.

11. The neodymium iron boron magnet according to claim 1,
wherein, the mass ratio of the main phase to the magnet is 86-94 wt. %, and the mass ratio of the grain boundary phase to the magnet is 5-14 wt. %.

12. The neodymium iron boron magnet according to claim 2, wherein, the neodymium iron boron magnet comprises: the content of Nd is 30.2%, Dy is 1.7%, Al is 0.6%, Cu is 0.4%, Co is 1%, Nb is 0.2%, B is 0.99%, and Fe is the balance; wherein, the percentage is the mass percentage of the element in the total amount of the elements;

or, the neodymium iron boron magnet comprises: the content of Nd is 30.8%, Dy is 1.1%, Al is 0.8%, Cu is 0.6%, Co is 1%, Nb is 0.2%, B is 0.99%, and Fe is the balance; wherein, the percentage is the mass percentage of the element in the total amount of the elements;

or, the neodymium iron boron magnet comprises: the content of Nd is 30.2%, Dy is 1.7%, Al is 0.6%, Cu is 0.48%, Co is 1%, Zr is 0.3%, B is 1%, and Fe is the balance; wherein, the percentage is the mass percentage of the element in the total amount of the elements;

or, the neodymium iron boron magnet comprises: the content of Nd is 30.2%, Tb is 1.1%, Al is 0.6%, Cu is 0.4%, Co is 1%, Zr is 0.3%, B is 0.985%, and Fe is the balance; wherein, the percentage is the mass percentage of the element in the total amount of the elements;

or, the neodymium iron boron magnet comprises: the content of Nd is 30.4%, Dy is 1.5%, Al is 1.25%, Cu is 0.39%, Co is 1%, Zr is 0.2%, B is 0.99%, and Fe is the balance; wherein, the percentage is the mass percentage of the element in the total amount of the elements;

or, the neodymium iron boron magnet comprises: the content of Nd is 30%, Dy is 2.2%, Al is 0.8%, Cu is 0.42%, Co is 1%, Zr is 0.2%, B is 0.99%, and Fe is the balance; wherein, the percentage is the mass percentage of the element in the total amount of the elements;

or, the neodymium iron boron magnet comprises: the content of Nd is 30%, Dy is 2.3%, Al is 0.6%, Cu is 0.4%, Co is 1%, Nb is 0.2%, B is 0.99%, and Fe is the balance; wherein, the percentage is the mass percentage of the element in the total amount of the elements;

or, the neodymium iron boron magnet comprises: the content of Nd is 29.8%, Dy is 2.3%, Al is 0.6%, Cu is 0.4%, Co is 1%, Nb is 0.2%, B is 0.99%, and Fe is the balance; wherein, the percentage is the mass percentage of the element in the total amount of the elements;

or, the neodymium iron boron magnet comprises: the content of Nd is 30.2%, Dy is 2.1%, Al is 0.6%, Cu is 0.4%, Co is 1%, Nb is 0.2%, B is 0.99%, and Fe is the balance; wherein, the percentage is the mass percentage of the element in the total amount of the elements;

or, the neodymium iron boron magnet comprises: the content of Nd is 30.2%, Dy is 1.9%, Al is 0.6%, Cu is 0.41%, Co is 1%, Nb is 0.2%, B is 0.99%, and Fe is the balance; wherein, the percentage is the mass percentage of the element in the total amount of the elements;

or, the neodymium iron boron magnet comprises: the content of Nd is 30.2%, Dy is 2.3%, Al is 0.5%, Cu is 0.4%, Co is 1%, Nb is 0.25%, B is 0.99%, and Fe is the balance; wherein, the percentage is the mass percentage of the element in the total amount of the elements;

or, the neodymium iron boron magnet comprises: the content of Nd is 29.5%, Dy is 1.5%, Al is 0.6%, Cu is 0.41%, Co is 1%, Nb is 0.2%, B is 0.99%, and Fe is the balance; wherein, the percentage is the mass percentage of the element in the total amount of the elements.

13. The neodymium iron boron magnet according to claim 1, wherein, the content of Cu is 0.35%-0.7%, the content of the RH is 1.0%-2.5%, and the content of the X is 0.15%-0.35%, the percentage is the mass percentage of the element in the total amount of the elements.

14. The neodymium iron boron magnet according to claim 2, wherein, the content of R is 29.5%-30.8%;
or, the content of the X is 0.15%-0.35%;
or, the content of Cu is 0.35%-0.7%;
wherein, the percentage is the mass percentage of the element in the total amount of the elements.

15. The neodymium iron boron magnet according to claim 2, wherein, the content of the RH is 1.0%-2.5%, the percentage is the mass percentage of the element in the total amount of the elements.

16. The neodymium iron boron magnet according to claim 1, wherein, the content of Cu is 0.35%-0.7%, the content of the RH is 1.0%-2.5%, and RH is dysprosium Dy or terbium Tb, the percentage is the mass percentage of the element in the total amount of the elements.

17. The neodymium iron boron magnet according to claim 2, wherein, the content of Cu is 0.35%-0.7%, the content of the RH is 1.0%-2.5%, and RH is dysprosium Dy or terbium Tb, the percentage is the mass percentage of the element in the total amount of the elements.

* * * * *